US006108354A

United States Patent [19]

Scull et al.

[11] Patent Number: 6,108,354

[45] Date of Patent: Aug. 22, 2000

[54] SYSTEM, DEVICE AND METHOD FOR DETECTING AND CHARACTERIZING IMPAIRMENTS IN A COMMUNICATION NETWORK

[75] Inventors: Christopher J. T. Scull; Richard A. Burch, both of Madison, Ala.

[73] Assignee: Motorola Inc., Schaumburg, Ill.

[21] Appl. No.: 08/885,710

[22] Filed: Jun. 30, 1997

[51] Int. Cl.[7] .................................................. H04J 3/12

[52] U.S. Cl. ........................ 370/523; 375/222; 375/231

[58] Field of Search .................................. 370/498, 522, 370/523; 375/231, 232, 233, 234, 235, 236, 229, 230, 242, 243, 244, 245, 246, 222; 714/799

[56] References Cited

U.S. PATENT DOCUMENTS 5,394,437 2/1995 Ayanoglu et al. .
5,406,583 4/1995 Dagdeviren .
5,528,625 6/1996 Ayanoglu et al. .
5,859,872 1/1999 Townshend ............................ 375/242
5,917,855 6/1999 Kim ........................................ 375/229

OTHER PUBLICATIONS

S Haykin, Communication System: Adaptive Equalization, 3rd ed., (New York: Wiley &Sons, pp. 452–457), 1994.

*Primary Examiner*—Ajit Patel
*Assistant Examiner*—Bob A. Phunkulh
*Attorney, Agent, or Firm*—Jordan C. Powell; Joanne N. Pappas

[57] ABSTRACT

A device system and method of detecting impairments in a communication network, involving: receiving during a plurality of time intervals equalized training signals which are produced from training symbols that have been transmitted over the network and equalized; generating reference symbols corresponding to the training symbols and equalized training signals; indexing the equalized training signals by their time intervals and corresponding reference symbols; calculating errors due to impairments from the indexed, equalized training signals; and detecting impairments in the network from the calculated impairment errors.

39 Claims, 5 Drawing Sheets

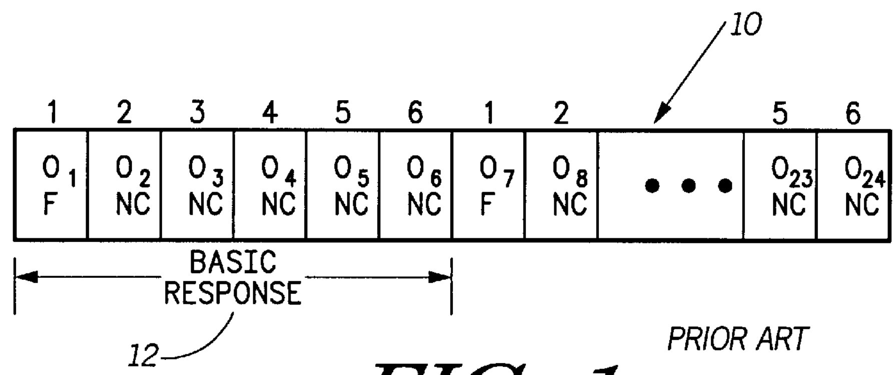
PRIOR ART
FIG. 1
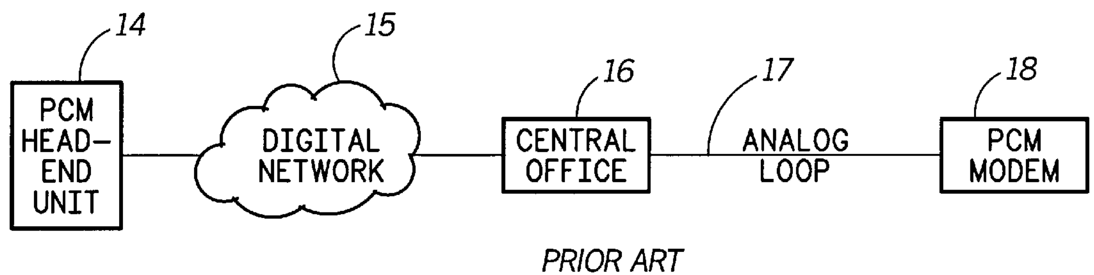
PRIOR ART
FIG. 2
| TRAINING SYMBOL DEFINITION | CODED LEVEL OF TRANSMITTED SYMBOL | REFERENCE SYMBOL | RES SENSITIVE |
|---|---|---|---|
| A | X | 00 | NO |
| B | Y | 01 | YES |
| –A | –X | 10 | NO |
| –B | –Y | 11 | YES |
TABLE A
FIG. 4
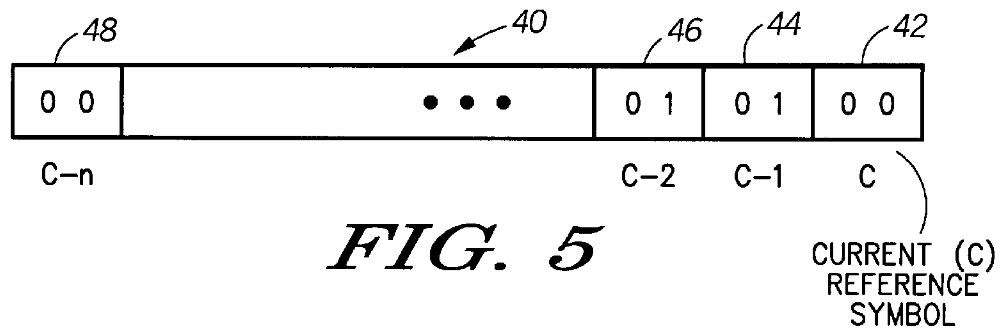
FIG. 5

50

TIME INTERVALS

| REFERENCE SYMBOLS | 1 | 2 | 3 | 4 | 5 | 6 |
|---|---|---|---|---|---|---|
| 0 0 (A) | $EQ_{R1}$ (52) | | | | | |
| 0 1 (B) | | | | | | |
| 1 0 (−A) | | | | | | |
| 1 1 (−B) | | | | | | |

TIME INTERVALS

| REFERENCE SYMBOLS | | 1 | 2 | 3 | 4 | 5 | 6 |
|---|---|---|---|---|---|---|---|
| C−2 | CURRENT (C) | | | | | | |
| −A | −A | | | | | | |
| −A | −B | | | | | | |
| −A | A | | | | | | |
| −A | B | | | | | | |
| −B | −A | $EQ'_{R1}$ (62) | | | | | $EQ_{R6}$ (66) |
| −B | −B | | | | | | |
| −B | A | I (64) | | | | | I (68) |
| −B | B | | | | | | |

| IMPAIRMENT CHARACTERIZATION (82) | A (84) | B (86) |
|---|---|---|
| NO IMPAIRMENT | ERROR TENDS TO ZERO | ERROR TENDS TO ZERO |
| RBS | ERROR TENDS TO ZERO | ERROR ACCUMULATES |
| DIGITAL PAD | ERROR TENDS TO ZERO | ERROR TENDS TO ZERO |
| RSB + DIGITAL PAD | ERROR TENDS TO ZERO | ERROR ACCUMULATES |
| DIGITAL PAD + RBS | ERROR ACCUMULATES | ERROR TENDS TO ZERO |
| RBS + DIGITAL PAD + RBS | ERROR ACCUMULATES | ERROR ACCUMULATES |

TABLE B

*FIG. 10*

SYSTEM, DEVICE AND METHOD FOR DETECTING AND CHARACTERIZING IMPAIRMENTS IN A COMMUNICATION NETWORK

FIELD OF THE INVENTION

This invention relates to detecting and characterizing impairments in a communication network, and more specifically to detecting and characterizing robbed bit signaling and robbed bit signaling in combination with digital padding in a digital network.

BACKGROUND OF INVENTION

One type of an impairment in a network is robbed bit signaling (RBS) which is a technique used in telephone networks to perform various control functions. RBS involves modifying data transmitted over a network, in particular, the least significant bit (LSB) of certain octets being transmitted. Though RBS is generally acceptable when the octets being transmitted in the network are used to carry voice or voice-data signals, with pulse code modulation (PCM) modems it effectively acts as noise or distortion which may cause high data error rates.

Many modern digital networks which may carry PCM modem data are constructed as T-carrier systems that use robbed bit signaling. The digital data transmitted over these networks is grouped into octets (eight (8) bits) and the octets are grouped into frames (twenty four (24) octets). In FIG. 1 there is shown a frame 10 containing 24 octets, $O_1$–$O_{24}$. The frames transmitted over the network are continuous, and the single 24 octet frame 10 is shown for descriptive convenience only. As indicated above, some of the octets are affected by RBS. That is, the network uses the least significant bit (LSB) position of the affected octets to carry data to perform control functions in the network. Thus, for example, the first octet, $O_1$, may affected by a type of RBS that forces the LSB of that octet to one, as indicated by the "F" in that octet. Depending on the octet of data carried in that interval, RBS may change that octet's data. In particular, if that octet had a zero in its LSB, RBS alters that octet. If, however, that octet had a one in its LSB, RBS would have no affect on the octet from the end-user's perspective.

It has been observed that RBS has deterministic periodicity with the most basic period being six octets. Therefore, in this example, the next affected octet is octet $O_7$, which is six octets removed, and so on. (The designation "NC" means "no change"). Since RBS recurs every six octets, the octets can be viewed as appearing in a basic period 12 of six time slots or intervals, 1–6, which may or may not be affected by RBS. For example, octets $O_1$, $O_7$, $O_{13}$ . . . etc., appear in interval "1" which is affected by RBS, while octets $O_2$, $O_8$, $O_{14}$ . . . etc., appear in interval "2" which is unaffected by RBS. It should be noted that due to the nature of the networks, it is possible to have more than one RBS affected interval in the basic period of six.

Another type of impairment in digital networks is a digital loss (typically 3 or 6 dB) in the network forced by digital pads. This loss affects all octets transmitted through the network. For example, this loss can cause a bit forced from a zero to a one by RBS to appear to be a zero. Thus, In certain network RBS/digital pad arrangements, such as when digital loss due to digital pads occurs before RBS and when there is RBS and digital loss followed by RBS, RBS may be difficult to detect and compensate for.

Therefore, a need exists for detecting and characterizing RBS and RBS/digital pad arrangements in networks in order to provide PCM modems information about these network impairments so that modem performance can be improved.

BRIEF DESCRIPTION OF THE DRAWINGS

FIG. 1 is a chart of a frame of octets and how they are affected by RBS;

FIG. 2 is a block diagram of a communication system in which the present invention may be utilized;

FIG. 4 is a table describing the training and reference symbols which may be used in accordance with this invention;

FIG. 5 is a diagram illustrating the structure of a reference symbol array in accordance with the present invention;

FIG. 6 is a diagram illustrating the structure of an index matrix in accordance with the present invention;

FIG. 7 is a diagram illustrating the structure of another index matrix in accordance with the present invention;

FIG. 10 is a table depicting how the various impairments are detected and characterized based on the error information contained in the impairment error matrix of FIG. 9.

DETAILED DESCRIPTION OF THE PREFERRED EMBODIMENT

Figure 3:
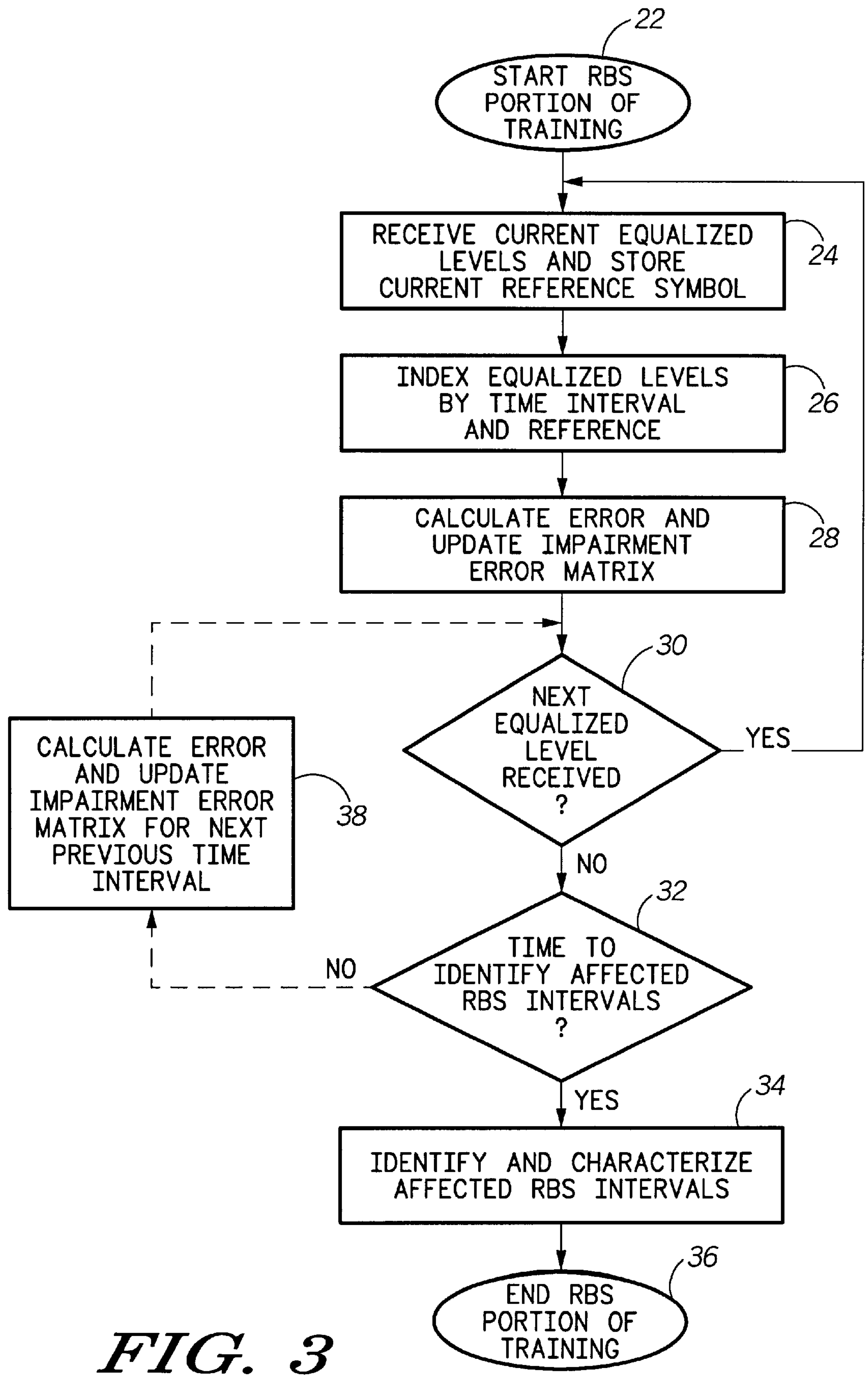
FIG. 3 is a flow diagram depicting detection and characterization of network impairments in a communication system according to the present invention.

As is known in the art, PCM head-end modems, such as modem 14, FIG. 2, transmit eight bit digital words (octets) corresponding to different output levels over digital networks, such as network 15. At the receiving modem's central office 16, the octets are converted to analog levels which are transmitted over an analog loop 17. The receiving PCM modem 18 then converts the analog levels into equalized digital levels. The equalized digital levels are ideally are mapped back into the originally transmitted octets. However, due to impairments in the digital network, the data in the transmitted octets may be corrupted causing a modified level to be received by the receiving modem thereby causing the modem to produce incorrect decisions.

The transmitted octets are converted in the network to analog levels according to one various accepted octet coding schemes. The preferred embodiment of this invention was undertaken for networks in the United States which use $\mu$-law coding. However, this invention is not limited to any particular coding scheme and can be easily modified for any other coding scheme. The modifications necessary appear only in the symbols chosen to train the modem.

The present invention provides a device, system and method for detecting and characterizing impairments in the digital network. Once the network impairments are known, the receiver can be adjusted accordingly to improve performance. The RBS detection and characterization techniques described below are preferably performed during training of the PCM modem, however, this is not a requirement of the present invention and they may be performed at other times which will be apparent to persons skilled in the art.

There is shown in FIG. 3 a high level flow diagram 20 depicting the detection and characterization of impairments in a communication network (in particular, the detection of robbed bit signaling in a digital network containing digital pads and the characterization of RBS/digital pad arrangements within the network) in accordance with this invention. Flow diagram 20 is discussed very generally first to provide a framework for the invention and then each step in the flow diagram is discussed in detail.

The PCM modem begins its RBS training sequence at step 22 which generally occurs after the PCM modem has synched up with the PCM head-end unit, the PCM equalizer has gone through a coarse training, and timing recovery has been achieved. At step 24, the current training level which has been equalized is received and a reference symbol generated by the receiving modem, which corresponds to the equalized training level and the transmitted training symbol, is stored in a reference symbol array. At step 26 the equalized level is indexed by reference and by time interval and stored in an index matrix. From the levels in the index matrix, one or more errors are calculated and an impairment error matrix is updated in step 28. In step 30, it is determined if the time interval between the reception of the current equalized level and the next equalized level has expired. If it has, at step 24 the next level is received. If it has not, at step 32 it is determined if it is time to identify the RBS affected intervals. If it is time, then at step 34 the RBS intervals are identified and at step 36 the RBS portion of the training is terminated. If at step 32 it is determined that it is not time to identify the RBS intervals, at step 38 one or more errors are calculated and the impairment error matrix is updated for the next previous interval. The flow then proceeds to step 30.

RBS Training Sequence

Before a detailed discussion of the individual steps in flow diagram 20, FIG. 3, is provided, a discussion of the training sequence is warranted. The basic requirements for the operational training sequence of this invention are the following: 1) that the training be conducted in a reference directed fashion, i.e., the transmitter and receiver have a priori knowledge of the symbols being transferred; and 2) at least two different octets producing different levels in the network (and their inverses) be used, wherein one of the octets is RBS sensitive (LSB=0) while the other is RBS insensitive (LSB=1). Thus, with the type of RBS that forces the LSB of the affected octet to a 1, one of the octets used must have a 1 in its LSB position (insensitive to RBS) and one must have a 0 in its LSB position (sensitive to RBS). The selection of symbols transferred is not limited to any specific levels. It is sufficient to select at least two symbols (and their inverses) which can be distinguished from each other in their RBS sensitivity. Other impairments which may occupy the transmission link (i.e. digital padding) must also be taken into account when selecting the symbols. That is, the symbol must be selected such that in the presence of digital padding the symbols' RBS sensitivity is changed from being RBS sensitive to RBS insensitive and vice-versa.

To simplify the a priori knowledge of both transmitter and receiver and to accomplish the minimum set of requirements for symbols transferred, two symbols A and B (and their inverses) are used. Symbol A is not sensitive to RBS and symbol B is sensitive to RBS such that if RBS is present symbol B is equal to symbol A. As noted above, symbol A has levels ±X and symbol B has levels ±Y. When RBS sets the LSB of ±A no change in magnitude takes place and the transmitted level is ±X. However, when RBS sets the LSB of ±B, the transmitted level becomes ±X.

During the training sequence, the head-end PCM modem transmits a random sequence of the four octets producing a random sequence of training symbols according to a random polynomial with a predetermined seed value. The training symbols are converted in the network to training levels. The receiving PCM modem also generates a random sequence of reference symbols (corresponding to the four octets) according to the same random polynomial and using the same seed value. Because the same polynomial and seed are used in both modems, the sequence of reference symbols corresponds directly to the sequence of transmitted octets. Thus, with proper synchronization, the receiving modem knows which training levels (corresponding to the transmitted training symbols) it should be receiving from the transmitting modem during the training sequence. The reference symbols indicate the correct magnitudes of the training levels and thus may used in conjunction with the actual received training levels to train the equalizer. In addition to training the equalizer, the reference symbols are used with the invention, as described below, to detect and characterize impairments in this network. Due to impairments on the channel, such as RBS and digital padding, the received training levels will not always correspond to the reference symbols and the transmitted training symbols.

It should be noted that in order to reduce complexity, the reference symbols generated by the receiving modem need not be the actual transmitted octets, but rather may be a shorthand form which corresponds to the actual transmitted octets and levels which they produce. Examples of the training and reference symbols which may be used in accordance with this invention are depicted in Table A, FIG. 4. The two octets or symbols used are defined as A and B which have analog levels X and Y, respectively. Also used are octets −A and −B having analog levels −X and −Y. The reference symbols have two bits each (00–11) to indicate these four possible transmitted symbols/levels in the training sequence. In this example, symbols A and −A are not RBS sensitive, while symbols B and −B are RBS sensitive.

Receive Equalized Level

Once the training sequence for RBS has begun, the transmitted training levels (which have been converted in the network from the transmitted training symbols/octets) are received by the PCM modem, digitized, and equalized (step 24, FIG. 3) for use according to the invention in detecting and characterizing RBS.

The preferred equalizer used with this invention is a decision feedback adaptive channel equalizer which takes the form of a $\delta[n]-K^*\delta[n-2]$ algorithm. This type of equalizer algorithm is described in many digital communications references. Examples of such references include the following: A. Openheim and R. Schafer, *Digital Signal Processing*, Englewood Cliffs, N.J.: Prentice Hall, 1975; L. Rabiner and B. Gold, *Theory and Application of Digital Signal Processing*, Englewood Cliffs, N.J.: Prentice Hall, 1975; A. Peled and B. Liu, *Digital Signal Processing: Theory, Design, and Implementation*, N.Y.: John Wiley and Sons, 1976; J. Salz, "Optimum Mean-Square Decision Feedback Equalization," *The Bell System Technical Journal*, Vol. 52, No. 8, October 1973, pp 1341–1373; and J. Prokis and J. Miller, "An adaptive Receiver for Digital Signaling Through Channels With Intersymbol Interference," *IEEE Transactions on Information Theory*, Vol. IT-15, No. 4, July 1969, pp 484–497.

With this type of algorithm a portion (fraction K) of the sample from the sample two time intervals prior, is used to establish improved channel estimation as a result of equalization and, the fractional effects of the two old received level (indicated by K) are embedded in the equalized output of the current level. This embodiment of the invention uses the full effect of the historical symbol by establishing that K=1.0. As will be apparent to those skilled in the art, equalizers using other values of K may be used with this invention as well as equalizers which do not use the effects of previously received levels.

Also, in this step the generated reference symbols are stored in reference array 40. It should be noted the reference symbols are not necessarily generated contemporaneously with the reception of the equalized training signals. In memory location 42, the current reference symbol, C, corresponding to the current received level is stored. In this case, a 0,0 is stored which indicates that a symbol A was transmitted and therefore a training level of X should have been received by the PCM modem. If the correct training level was received, i.e. an X, it would then be converted back to the octet A by the receiving modem. Array 40 stores a history of reference symbols including the previously generated reference symbol, C-1, in memory location 44; the reference symbol generated two intervals prior to the current interval, C-2, in memory location 46; and the reference symbol generated n intervals prior to the current interval, C-n, in memory location 48. These stored reference symbols are used as described below.

Index Equalized Levels by Interval and Reference

Each equalized level received is indexed by its interval and by its corresponding reference symbol(s) (step 26, FIG. 3). Index matrix 50, FIG. 6, has six columns corresponding to the six RBS time intervals of the basic RBS period 12, FIG. 1, and four rows corresponding to the four reference symbols. This very basic matrix is used to describe the concept of indexing the equalized levels by reference and time interval according to this invention. A more complicated matrix which utilizes equalizer outputs which are a combination of the current received level and a previous level, such as the level received two time intervals prior to the current interval (C-2), is used in the preferred embodiment of the invention and is described below with regard to FIG. 7.

Referring to index matrix 50, FIG. 6, the equalized levels are stored in the cell of the matrix where the column of the time interval of the equalized level and the row of the corresponding reference symbol generated intersect. For example, in cell 52, the level $EQ_{R1}$ is stored, which is the current, equalized level received by the PCM modem. For purposes of description we assume that the current level is received in time interval 1. As indicated in FIG. 4, the current reference symbol, C, is 0,0. This indicates that the current received level should have a magnitude equal to X, which corresponds to symbol A. Therefore, $EQ_{R1}$ is stored in row A in the cell which intersects the column for time interval 1. However, due to impairments in the network, the actual received level, $EQ_{R1}$, may not have a value equivalent to X.

Index matrix 60, FIG. 7, has six columns corresponding to the six time intervals of the basic period 12, FIG. 1, and eight rows corresponding to various combinations the current reference symbol and a previous reference symbol, which is in the preferred embodiment the reference symbol generated two time intervals prior to the current one, namely, C-2. As indicated above, the equalized levels which are indexed are combinations of the current level and the level received two time intervals prior.

Since there are four possible reference symbols for both the current and C-2 time intervals, there are actually sixteen possible combinations of the current reference symbol and a previous reference symbol. This would produce a matrix six columns by sixteen rows which would be used to store different equalized levels as indicated by the reference index and the time interval. Only after all of these cells had been filled in satisfactorily and combinations of them had been performed (as described below) could a statistical judgment on impairments be made. Using such a large matrix utilizes too much of the assigned training time for impairment detection. To get better efficiency and therefore higher update rates (which lowers the required training time) the matrix is folded according to its symmetry in polarity. The matrix is reduced to the eight rows of matrix 60 by utilizing only positive reference symbol indexes into the matrix. The negative reference symbols are negated as are the associated received levels, thereby folding the reference symbols onto the positive indexes and the received levels are stored at the new computed index.

The received equalized levels are stored in the cell of the matrix where the column of the time interval of the equalized level and the row of the corresponding reference symbols generated intersect. Using the reference symbols stored in array 40, FIG. 5, for example, in cell 62, FIG. 7, is stored the octet, $EQ'_{R1}$, corresponding to the current, equalized level received by the PCM modem. For purposes of description we assume that the current training symbol is transmitted and its corresponding level is received in time interval 1. As indicated in FIG. 4, the current reference symbol, C, is 0,0, which is an A, and the C-2 reference symbol is 0,1, which is a B. Therefore, the level, $EQ'_{R1}$, for the current, equalized level is stored in the −B,−A row in the cell which intersects with the column for time interval 1.

Index matrices 50 and 60 must be initialized before the received equalizer levels are stored therein. This is accomplished by storing the ideal levels (I) (i.e., the levels that would be received absent impairments on the line) designated for each row in each cell of that row. As the equalized levels are indexed in the matrices, the initialized levels, I, are written over. Thus, for the first row, row A, of index matrix 50, FIG. 6, a level of X would be initially stored in each cell. Similarly for the second through fourth rows, B, −A and −B, the levels for each row initially stored in the cells are Y, −X, and −Y, respectively. In index matrix 60, FIG. 7, the eight rows have the following levels stored in their cells: Row −A,−A→(−X−X); Row −A,−B→(−X−Y); Row −A,+A→(X−X); −A,+B→(−X+Y); −B,−A→(−Y−X); −B,−B→(−Y−Y); −B,+A →(−Y+X); and −B,+B→(Y−Y).

Calculate Error and Update Impairment Error Matrix

Each time an equalized level is stored in index matrix 60 an error value for the current received level is calculated and an impairment error matrix is updated (step 28, FIG. 3). This may be better understood with reference to FIG. 8.

Each equalized received level has a combination of influences that go into its computation. The removal of these contributing influences is the key to determining separable impairment evaluation. To eliminate any historical equalizer inaccuracies for the historical received level, it is run through the equalizer with its current gains and produces a historical received level equalized to the current coefficients. The current equalized, received level is stored in the index matrix by its reference index, and the historical received level which has been equalized using the current equalizer coefficients is stored at its appropriate index. A combinatorial logic of matrix cells is then applied to separate the different impairment influences. The desired combination of cells is determined by the current computed reference index. If the index is one of a pair of related indices then the equalized levels in the related rows are combined to result in two separate levels.

Figure 8:
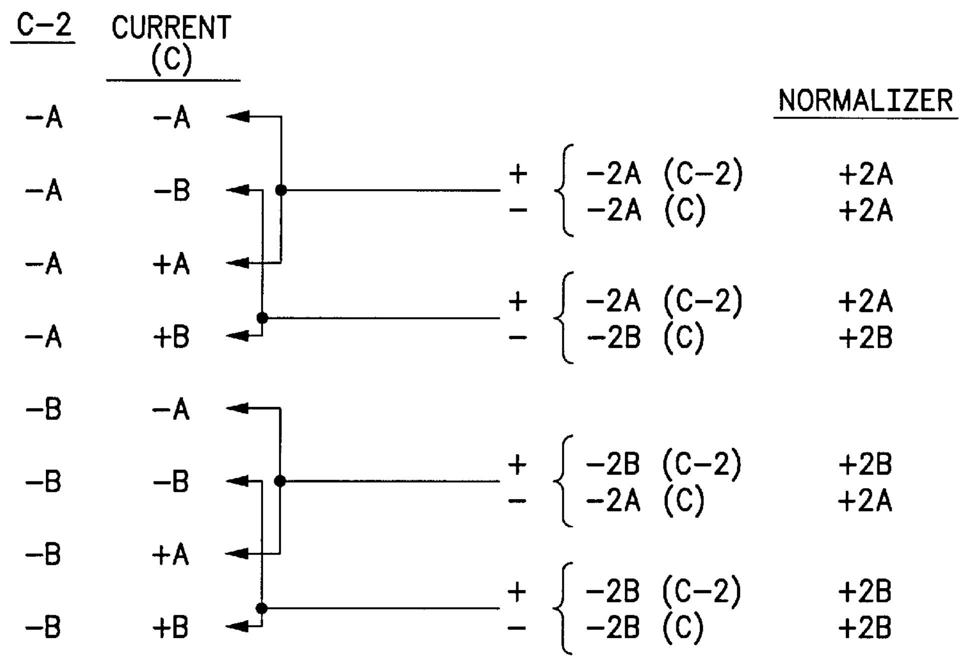
FIG. 8 depicts the arithmetic combinations of the reference symbols of the index matrix of FIG. 7 in accordance with the present invention.

In FIG. 8, there are shown the eight combinations of current reference symbols and previous reference symbols and how related combinations can be combined arithmetically to eliminate the effects of certain terms. Take for example the first and third rows of cells which contain combinations of the symbol A. These combinations include impairments and any anomalies in the connection. The equalizer adjusts the received level for the anomalies which leaves, for the most part, contributions due to the transmitted symbol and the impairments. However, the equalizer adds influences from historical received levels. When the levels of the first and third rows are combined (added/subtracted) the historical influences introduced by the equalizer are eliminated. The result is a level which only contains the symbol A and the impairments to A. Since we know what level A is supposed to be, we normalize this level against the known level A and what is left is the contribution of the impairment to A. Repeating this combination and the other combinations described below at each time interval according to the reference symbols this indicates what impairments are present during each time interval.

The first combination involves −A,−A and −A,+A which may be combined by adding the two or by taking their difference as follows:

$$\text{add } --A(C\text{-}2)-A(C)+-A(C\text{-}2)+A(C)=-2A(C\text{-}2) \quad (1)$$

$$\text{sub } --A(C\text{-}2)-A(C)-[-A(C\text{-}2)+A(C)]=-2A(C) \quad (2)$$

In the first case, equation 1, where the combinations are added, the two current A terms, A(C), cancel leaving the two −A(C-2) terms, from which a normalizing factor of +2A (where A has a value equivalent to the analog level X in Table A, FIG. 4) may be derived. The normalizing factor is chosen by determining the value that will cause the particular combination to equal zero. As demonstrated above, adding −A,−A and −A,+A results in −2A(C-2) which is ideally equivalent to −2A (the value of A is the same regardless of when it is received). Thus, by combining 2A with −2A(C-2) zero should be obtained. When, however, the actual levels stored in index matrix 60, FIG. 7, at cell locations −A,−A and −A,+A (in a common time interval) are added and compared to the normalizing factor, +2A, a result of zero may not be obtained. The result of the comparison is an error which may be caused by RBS and/or digital padding in the digital network during the particular time interval.

In the second case, equation 2, where the difference between the combinations is taken, the two previous A terms, A(C-2), cancel leaving the two −A terms, from which a normalizing factor of +2A is derived.

The second combination involves −A,−B and −A,+B which may be combined by adding the two or by taking their difference as follows:

$$\text{add } --A(C\text{-}2)-B(C)+-A(C\text{-}2)+B(C)=-2A(C\text{-}2) \quad (3)$$

$$\text{sub } -A(C\text{-}2)-B(C)-[-A(C\text{-}2)+B(C)]=-2B(C) \quad (4)$$

In the first case, equation 3, where the combinations are added, the two current A terms, A(C), cancel leaving the two −A(C-2) terms, from which a normalizing factor of +2A is derived. In the second case, equation 4, where the difference between the combinations is taken, the two previous A terms, A(C-2), cancel leaving the two −B terms, from which a normalizing factor of +2B is derived.

The third combination involves −B,−A and −B,+A which may be combined by adding the two or by taking their difference as follows:

$$\text{add } --B(C\text{-}2)-A(C)+-B(C\text{-}2)+A(C)=-2B(C\text{-}2) \quad (5)$$

$$\text{sub } --B(C\text{-}2)-A(C)-[-B(C\text{-}2)+A(C)]=-2A(C) \quad (6)$$

In the first case, equation 5, where the combinations are added, the two current A terms, A(C), cancel leaving the two −B(C-2) terms, from which a normalizing factor of +2B is derived. In the second case, equation 6, where the difference between the combinations is taken, the two previous B terms, B(C-2), cancel leaving the two −A terms, from which a normalizing factor of +2A is derived.

The fourth and final combination involves −B,−B and −B,+B which may be combined by adding the two or by taking their difference as follows:

$$\text{add } --B(C\text{-}2)-BC)+-B(C\text{-}2)+B(C)=-2B(C\text{-}2) \quad (7)$$

$$\text{sub } -B(C\text{-}2)-B(C)-[-B(C\text{-}2)+B(C)]=-2B(C) \quad (8)$$

In the first case, equation 7, where the combinations are added, the two current B terms, B(C), cancel leaving the two −B(C-2) terms, from which a normalizing factor of +2B is derived. In the second case, equation 8, where the difference between the combinations is taken, the two previous B terms, B(C-2), cancel leaving the two −B terms, from which a normalizing factor of +2B is derived.

Figure 9:
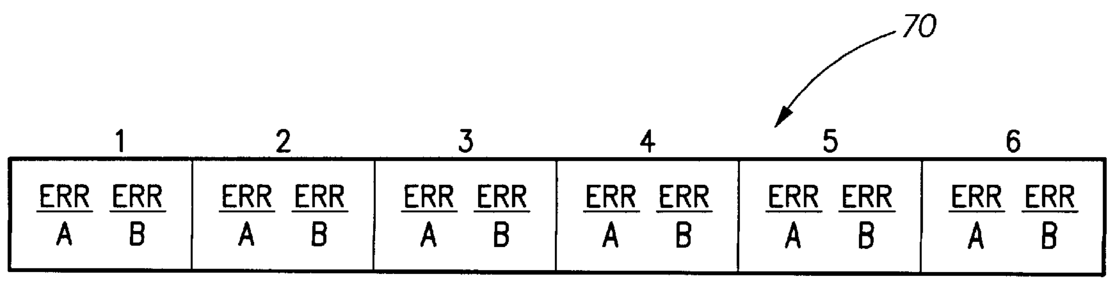
FIG. 9 is a diagram illustrating the structure of an impairment error matrix in accordance with the present invention.

From these equations and the normalizing factors, errors for training symbols A and B are accumulated for each of the time intervals 1–6 in impairment error matrix 70, FIG. 9. For example, the current (C) equalized level, $EQ'_{R1}$, is stored in cell 62, FIG. 7. That cell is at the intersection of the column for time interval 1 and the row for reference symbol combination −B,−A. As shown in FIG. 8, reference symbol combination −B,−A can be combined with reference symbol combination −B,+A arithmetically by adding the two or taking their difference. Thus, the level, $EQ'_{R1}$, within cell 62 is combined in the same manner with the level, I (in this example the initialized level), in cell 64. From the arithmetic combinations, it is apparent that the only contributing symbol in the case of the addition is B and in the case of the subtraction it is A. An error is calculated for both the addition and subtraction and the impairment error matrix 70 for the time interval is updated. In the case of the addition, $EQ'_{R1}$ is added to I and the normalizing factor (i.e., ideal value of adding the levels of cells 62 and 64) is added thereto as follows:

$$(EQ'_{R1}+I)+2B=B_{error} \quad (9)$$

The error, $B_{error}$, is accumulated by adding it to the existing error value for symbol B in time interval 1 of impairment error matrix 70.

In the case of the subtraction, I is subtracted from $EQ'_{R1}$ and the normalizing factor (i.e., ideal value of subtracting the levels of cells 62 and 64) is added thereto as follows:

$$(EQ'_{R}-I)+2A=A_{error} \quad (10)$$

The error, $A_{error}$, is accumulated by adding it to the existing error value for symbol A in time interval 1 of impairment error matrix 70.

In general, the current equalized level that has been stored in the index matrix is used by adding to it and subtracting from it another level according to the combinations depicted in FIG. 8 and the equations (1)–(8) described above. Then, the sums and differences are normalized with the normalizing factors in FIG. 8, in the manner described above with regard to equations (9) and (10), to determine the current errors, $A_{error}$ and/or $B_{error}$.

Next Equalized Level Received

PCM modem 18, FIG. 2, operates on an internal sample clock which indicates specific times at which new samples should be taken from the phone line connection. The sample interval is measured and an interrupt is used to start all sample processing when the interval expires. As part of sample processing the level captured from the phone line at the interrupt time is run through the hardware front end of the receiver and through the equalizer to become the next equalized training level received for the RBS training according to this invention.

Time to Identify Affected Intervals

When enough iterations of the indexing, combination, and normalization are completed, the time intervals affected by RBS can be identified. The defining standard for completion is the convergence toward known results or criteria. Convergence is application dependent on receiver construction and receiver gains during this segment of training as well as training symbols chosen. There is a point in time where the impairment error matrix fails to improve a judgment on the time intervals containing RBS, and it is at that point that the error values have converged and the RBS affected intervals can be identified. The convergence criteria is the point at which the error value fails to diminish (get closer to zero) or gets close to the expected error value. The expected error value is calculated from the permutations of different impairment combinations TABLE B, FIG. 8. To eliminate the overhead of checking for convergence the embodiment of this invention uses a time interval empirically derived using the convergence criteria stated above.

Identify and Characterize Affected Intervals

When it is determined that it is time to identify affected time intervals in step 32, FIG. 3, $A_{error}$ and $B_{error}$ values in impairment error matrix 70, FIG. 8, for each time interval are evaluated. Chart 80, FIG. 10, is used to detect and characterize the various types of impairments that may be affecting the data in each time interval. Column 82 contains the different types of impairments that may be encountered, column 84 lists the error criteria of $A_{error}$ for each type of impairment and column 86 lists the error criteria of $B_{error}$ for each type of impairment.

When both errors, $A_{error}$ and $B_{error}$, tend to zero in a given time interval, this indicates either that there is no impairment present or that there is digital padding for that time interval. When $A_{error}$ tends to zero and $B_{error}$ accumulates in a given time interval, this indicates that RBS or RBS followed by digital padding is present in the network in that time interval. When $A_{error}$ accumulates and $B_{error}$ tends to zero in a given time interval, this indicates that there is digital padding followed by RBS in the network for that time interval. And, when both $A_{error}$ and $B_{error}$ accumulate in a given time interval, this indicates that there is RBS followed by digital padding which is then followed by RBS in the network for that time interval.

In certain networks the RBS is such that the LSB is forced to 0 not 1. In those networks, the normally RBS sensitive training symbol (B) becomes insensitive and the normally RBS insensitive training symbol (A) becomes the RBS sensitive point. This change in no way affects the collection of the error data in impairment error matrix 70, FIG. 9. The difference lies how the error data is analyzed. To evaluate impairments in networks with the "zero-type", RBS the error criteria in columns 84 and 86 of Chart 80, FIG. 10, are exchanged.

Calculate Error and Update Impairment Error Matrix for Next Previous Time Interval When the processing power with which this embodiment of the invention is applied results in more than ample time to complete an iteration of the algorithm, the extra time may be used to perform multiple iterations of the algorithm using historical data already available and updating results accordingly. This increases the convergence rate of the impairment error matrix 70 toward a discernible judgment criteria and allows earlier identification of RBS affected time intervals. In step 30, FIG. 3, there is an option to loop back to the top and repeat the algorithm a number of times.

Taking the example described above where the current equalized level is stored in cell 62, FIG. 7, after the errors are calculated and stored in impairment error matrix 70, FIG. 8, in step 38 the errors for the corresponding cell, cell 66, in the previous time interval (interval six) are calculated and the impairment error matrix 70 is updated. An error is calculated for both the addition and subtraction and the impairment error matrix 70 for the time interval is updated. In the case of the addition, $EQ_{R6}$ is added to I (the initialized level stored in cell 68) and the normalizing factor (i.e., ideal value of adding the levels of cells 66 and 68) is added thereto as follows:

$$(EQ_{R6}+I)+2B=B_{error} \quad (11)$$

The error, $B_{error}$, is added to the existing error value for symbol B in time interval six of impairment error matrix 70.

In the case of the subtraction, I is subtracted from $EQ_{R6}$ and the normalizing factor (i.e., ideal value of subtracting the levels of cells 66 and 68) is added thereto as follows:

$$(EQ_{R6}-I)+2A=A_{error} \quad (12)$$

The error, $A_{error}$, is added to the existing error value for symbol A in time interval six of impairment error matrix 70.

This process continues until the next equalized symbol is ready to be received or it is time to identify affected time intervals. That is, one or more errors are calculated and the impairment error matrix is updated for next previous time intervals (time intervals five, four . . . etc.), step 38.

End of RBS Portion of Training

In step 36 of flow diagram 20, FIG. 3, the RBS portion of the modem training is ended. The impairment detection and characterization information obtained according to this invention may then be used to adjust the receiver to more accurately receive the incoming data even in networks having previously difficult to detect RBS/digital pad arrangements, such as when digital loss due to digital pads occurs before RBS and when there is RBS and digital loss followed by RBS. Once the affected RBS time intervals are determined and characterized, a manipulation of the received analog constellation may be made. That is, with regard to each time interval, the impairment information obtained may be used to decide whether or not to re-map the RBS sensitive constellation points for each time interval.

In summary, the invention includes a method and device for detecting impairments in a communication network. The method and device involve receiving during a plurality of time intervals equalized training signals (i.e. levels) which are produced from training symbols that have been transmitted over the network and equalized; generating reference symbols corresponding to the training symbols and the equalized training signals; indexing the equalized training signals by their time intervals and corresponding reference symbols; calculating errors due to impairments from the indexed, equalized training signals; and detecting impairments in the network from the calculated impairment errors.

The training symbols are predefined and transmitted in a random training sequence. The training symbols are initially transmitted in digital form grouped in octets. The training symbols include two different octets and their inverses, wherein one of the octets and its inverse are sensitive to robbed bit signaling and the other octet and its inverse are insensitive to robbed bit signaling. The transmitted octets may be affected by robbed bit signaling and/or digital padding in the network. Generating reference symbols includes storing a reference symbol for each transmitted octet, thereby forming a reference symbol array including the reference symbol corresponding to the current training symbol and a history of reference symbols corresponding to previously transmitted training symbols. Each of the plurality of time intervals during which the equalized training signals are received corresponds to a time interval during which corresponding octets are transmitted. The number of time intervals is equivalent to a basic robbed bit signaling period and the basic robbed bit signaling period includes six robbed bit signaling time intervals. The corresponding reference symbols of each equalized training signal are the combination of the reference symbol corresponding to the current training signal and the reference symbol corresponding to the training signal transmitted two time intervals prior to the current training signal.

Indexing includes forming a matrix of cells having the columns designated as the robbed bit signaling time intervals and the rows designated by combinations of reference symbols. Wherein the step of indexing further includes storing equalized signals in the cell of the matrix at the intersection of its robbed bit signaling time interval and its corresponding current and previous reference symbol combination. Calculating includes arithmetically combining the current equalized signal stored in the matrix with a signal in a related cell in the time interval of the current equalized signal (column) and normalizing the result to obtain a training signal error. Calculating further includes accumulating a plurality of training signal errors for each of the training signals in each of the time intervals for a predetermined time period.

Detecting includes evaluating the accumulated training signal errors in each time interval to detect the presence of impairments in each time interval. Evaluating includes comparing the accumulated training signal errors in each time interval with predetermined error characteristics and characterizing the type of detected impairments in each time interval. The types of detected impairments include robbed bit signaling, robbed bit signaling followed by digital padding and robbed bit signaling followed by digital padding which is then followed by robbed bit signaling. Calculating further includes arithmetically combining equalized signals stored in the matrix in the next previous time intervals having the corresponding current and previous reference symbol combination with related cells in the next previous time intervals and normalizing the results to obtain additional training signal errors until the next equalized training signal is received or the predetermined time period has expired.

This invention also includes a method and system for detecting and characterizing impairments in a communication network which involves transmitting during a plurality of time intervals training symbols over the network which are converted in the network to training signals; equalizing the transmitted training signals; receiving the equalized training signals; generating reference symbols corresponding to the training symbols and equalized training signals; indexing the equalized training signals by their time intervals and corresponding reference symbols; calculating errors due to impairments from the indexed, equalized training signals; and detecting and characterizing impairments in the network from the calculated impairment errors.

The present invention may be embodied in other specific forms without departing from the spirit or essential characteristics. The described embodiments are to be considered in all respects only as illustrative and not restrictive. The scope of the invention is, therefore, indicated by the appended claims rather than by the foregoing description. All changes which come within the meaning and range within the equivalency of the claims are to be embraced within their scope.

What is claimed is:

1. A method of detecting impairments in a communication network, comprising:

receiving during a plurality of time intervals equalized training signals which are produced from training symbols that have been transmitted over the network and equalized;

generating reference symbols corresponding to the training symbols and equalized training signals;

indexing the equalized training signals by their time intervals and corresponding reference symbols;

calculating errors due to impairments from the indexed, equalized training signals; and detecting impairments in the network from the calculated impairment errors.

2. The method of claim 1 wherein the training symbols are predefined and transmitted in a random training sequence.

3. The method of claim 2 wherein the training symbols are initially transmitted in digital form grouped in octets.

4. The method of claim 3 wherein the training symbols include two different octets and their inverses.

5. The method of claim 4 wherein one of the octets and its inverse are sensitive to robbed bit signaling and the other octet and its inverse are insensitive to robbed bit signaling.

6. The method of claim 3 wherein the transmitted octets may be affected by robbed bit signaling and/or digital padding in the network.

7. The method of claim 6 wherein the step of generating includes storing a reference symbol for each transmitted octet, thereby forming a reference symbol array including the reference symbol corresponding to the current training symbol and a history of reference symbols corresponding to previous training symbols.

8. The method of claim 7 wherein each of the plurality of time intervals during which the equalized training signals are received corresponds to a time interval during which corresponding octets are transmitted.

9. The method of claim 8 wherein the number of time intervals is equivalent to a basic robbed bit signaling period.

10. The method of claim 9 wherein the basic robbed bit signaling period includes six robbed bit signaling time intervals.

11. The method of claim 10 wherein the corresponding reference symbols of each equalized training signal are the combination of the reference symbol corresponding to the current training signal and the reference symbol corresponding to the training signal transmitted two time intervals prior to the current training signal.

12. The method of claim 11 wherein the step of indexing includes forming a matrix of cells having one of the rows and columns designated with the robbed bit signaling time intervals and the other of the rows and columns designated with combinations of reference symbols and wherein the step of indexing further includes indexing the current equalized signal in the cell of the matrix at the intersection of its robbed bit signaling time interval and its corresponding current and previous reference symbol combination.

13. The method of claim 12 wherein the step of calculating includes arithmetically combining the current equalized signal stored in the matrix with a signal in a related cell in the time interval of the current equalized signal and normalizing the result to obtain a training signal error.

14. The method of claim 13 wherein the step of calculating further includes accumulating a plurality of training signal errors for each of the training signals in each of the time intervals for a predetermined time period.

15. The method of claim 14 wherein the step of detecting includes evaluating the accumulated training signal errors in each time interval to detect the presence of impairments in each time interval.

16. The method of claim 15 wherein the step of evaluating includes comparing the accumulated training signal errors in each time interval with predetermined error characteristics and characterizing the type of detected impairments in each time interval.

17. The method of claim 16 wherein the types of detected impairments include robbed bit signaling, robbed bit signaling followed by digital padding and robbed bit signaling followed by digital padding which is then followed by robbed bit signaling.

18. The method of claim 16 wherein the step of calculating further includes arithmetically combining equalized signals stored in the matrix in the next previous time intervals having the corresponding current and previous reference symbol combination with related cells in the next previous time intervals and normalizing the results to obtain additional training signal errors until the next equalized training signal is received or the predetermined time period has expired.

19. A method of detecting and characterizing impairments in a communication network, comprising:

transmitting during a plurality of time intervals training symbols over the network which are converted in the network to training signals;

equalizing the transmitted training signals;

receiving the equalized training signals;

generating reference symbols corresponding to the training symbols and the equalized training signals;

indexing the equalized training signals by their time intervals and corresponding reference symbols;

calculating errors due to impairments from the indexed, equalized training signals; and detecting and characterizing impairments in the network from the calculated impairment errors.

20. In a PCM modem, a device for detecting impairments in a communication network, comprising:

means for receiving during a plurality of time intervals equalized training signals which are produced from training symbols that have been transmitted over the network and equalized;

means for generating reference symbols corresponding to the training symbols equalized training signals;

means for indexing the equalized training signals by their time intervals and corresponding reference symbols;

means for calculating errors due to impairments from the indexed, equalized training signals; and means for detecting impairments in the network from the calculated impairment errors.

21. The device of claim 20 wherein the training symbols are predefined and transmitted in a random training sequence.

22. The device of claim 21 wherein the training symbols are initially transmitted in digital form grouped in octets.

23. The device of claim 22 wherein the training symbols include two different octets and their inverses.

24. The device of claim 23 wherein one of the octets and its inverse are sensitive to robbed bit signaling and the other octet and its inverse are insensitive to robbed bit signaling.

25. The device of claim 24 wherein the transmitted octets may be affected by robbed bit signaling and/or digital padding in the network.

26. The device of claim 25 wherein the means for generating includes means for storing a reference symbol for each transmitted octet, thereby forming a reference symbol array including the reference symbol corresponding to the current training symbol and a history of reference symbols corresponding to previously transmitted training symbols.

27. The device of claim 26 wherein each of the plurality of time intervals during which the equalized training signals are received corresponds to a time interval during which corresponding octets are transmitted.

28. The device of claim 27 wherein the number of time intervals is equivalent to a basic robbed bit signaling period.

29. The device of claim 28 wherein the basic robbed bit signaling period includes six robbed bit signaling time intervals.

30. The device of claim 29 wherein the corresponding reference symbols of each equalized training signal is the combination of the reference symbol corresponding to the current training signal and the reference symbol corresponding to the training signal transmitted two time intervals prior to the current training signal.

31. The device of claim 30 wherein the means for indexing includes means for forming a matrix of cells having one of the rows and columns designated with the robbed bit signaling time intervals and the other of the rows and columns designated with combinations of reference symbols and wherein the means for indexing further includes means for indexing the current equalized signal in the cell of the matrix at the intersection of its robbed bit signaling time interval and its corresponding current and previous reference symbol combination.

32. The device of claim 31 wherein the means for calculating includes means for arithmetically combining the current equalized signal stored in the matrix with a signal in a related cell in the time interval of the current equalized signal and for normalizing the result to obtain a training signal error.

33. The device of claim 32 wherein the means for calculating further includes means for accumulating a plurality of training signal errors for each of the training signals in each of the time intervals for a predetermined time interval.

34. The device of claim 33 wherein the means for detecting includes means for evaluating the accumulated training signal errors in each time interval to detect the presence of impairments in each time interval.

35. The device of claim 34 wherein the means for evaluating includes means for comparing the accumulated training signal errors in each time interval with predetermined error characteristics and for characterizing the type of detected impairments in each time interval.

36. The device of claim 35 wherein the types of detected impairments include robbed bit signaling, robbed bit signaling followed by digital padding and robbed bit signaling followed by digital padding which is then followed by robbed bit signaling.

37. The device of claim 35 wherein the means for calculating further includes means for arithmetically combining equalized signals stored in the matrix in the next previous time intervals having the corresponding current and previous reference symbol combination with related cells in the next previous time intervals and for normalizing the results to obtain additional training signal errors until the next equalized training signal is received or the predetermined time period has expired.

38. A system for detecting and characterizing network impairments in a communication network, comprising:

means for transmitting during a plurality of time intervals training symbols over the network which are converted in the network to training signals;

means for equalizing the transmitted training signals;

means for receiving the equalized training signals;

means for generating reference symbols corresponding to the training symbols and the equalized training signals;

means for indexing the equalized training signals by their time intervals and corresponding reference symbols;

means for calculating errors due to impairments from the indexed, equalized training signals; and means for detecting and characterizing impairments in the network from the calculated impairment errors.

39. A computer useable medium having computer readable program code means embodied therein for detecting impairments in a communication network, comprising:

computer readable program code means for receiving during a plurality of time intervals equalized training signals which are produced from training symbols that have been transmitted over the network and equalized;

computer readable program code means for generating reference symbols corresponding to the training symbols and the equalized training signals;

computer readable program code means for indexing the equalized training signals by their time intervals and corresponding reference symbols;

computer readable program code means for calculating errors due to impairments from the indexed, equalized training signals; and computer readable program code means for detecting impairments in the network from the calculated impairment errors.

* * * * *